(12) United States Patent
Simon et al.

(10) Patent No.: US 6,490,505 B1
(45) Date of Patent: Dec. 3, 2002

(54) IRRIGATION TIMER WITH MULTIPLEXING WATERING MODE

(75) Inventors: Timothy M. Simon, San Francisco, CA (US); Blaine M. Smith, Portland, OR (US)

(73) Assignee: Tim Simon, Inc., San Francisco, CA (US)

( * ) Notice: Subject to any disclaimer, the term of this patent is extended or adjusted under 35 U.S.C. 154(b) by 0 days.

(21) Appl. No.: 09/440,300

(22) Filed: Nov. 17, 1999

(51) Int. Cl.[7] ............................................. G05D 7/00
(52) U.S. Cl. .......................... 700/284; 239/69; 239/70; 137/624.11
(58) Field of Search ........................... 700/284; 239/61, 239/65, 67, 64, 68, 69, 70, 71, 72, 94; 137/624.11, 78.3

(56) References Cited

U.S. PATENT DOCUMENTS

| | | | | |
|---|---|---|---|---|
| 4,165,532 A | * | 8/1979 | Kendall et al. .............. | 700/284 |
| 4,760,547 A | * | 7/1988 | Duxbury ...................... | 700/284 |
| 4,951,204 A | * | 8/1990 | Mylne, III ................... | 700/284 |
| 5,038,268 A | * | 8/1991 | Krause et al. ................. | 700/16 |
| 5,187,797 A | * | 2/1993 | Nielsen et al. ............... | 345/708 |
| 5,251,153 A | * | 10/1993 | Nielsen et al. .............. | 700/284 |
| 5,293,554 A | * | 3/1994 | Nicholson ................... | 700/284 |
| 5,337,957 A | * | 8/1994 | Olson ........................... | 239/63 |
| 5,444,611 A | * | 8/1995 | Woytowitz et al. ............ | 700/16 |
| 5,602,728 A | * | 2/1997 | Madden et al. ............... | 700/16 |
| 5,715,866 A | * | 2/1998 | Granger ................. | 137/624.11 |
| 5,797,417 A | * | 8/1998 | Delattre et al. ............ | 137/78.3 |
| 5,921,280 A | * | 7/1999 | Ericksen et al. ....... | 137/624.11 |

* cited by examiner

*Primary Examiner*—Leo Picard
*Assistant Examiner*—Chad Rapp
(74) *Attorney, Agent, or Firm*—James F. Hann; Haynes, Beffel & Wolfeld LLP

(57) ABSTRACT

An irrigation timer (2) includes a controller (8), including output signal terminals (18) coupleable to irrigation valve actuators (20) and an internal clock, and user inputs (12). Each irrigation valve actuator is coupleable to an irrigation valve for a watering zone with a watering period setting for each of the watering zones during a watering cycle (96). The controller divides the watering period for each watering zone by an integer n greater than 1 to obtain fractional watering periods (98). This permits each zone to be watered for its fractional watering period during a first fractional watering cycle (100) prior to beginning a second fractional watering cycle n of the fractional watering cycles constitute the watering cycle. The use of fractional watering periods help to spread out watering over a long period of time in each zone.

6 Claims, 4 Drawing Sheets

IRRIGATION TIMER WITH MULTIPLEXING WATERING MODE

CROSS-REFERENCE TO RELATED APPLICATIONS

This is related to the following U.S. Patent Applications of the same inventors, filed on the same day as this application and assigned to the same assignee: "Irrigation Timer and Clock Initialization Method" and "Irrigation Timer".

BACKGROUND OF THE INVENTION

Irrigation timers are used to control the delivery of water to sprinkler heads, driplines, etc. Most irrigation timers are set up to deliver water to sets of sprinklers in different watering zones to ensure that the sprinklers are provided with adequate water pressure. This also permits the different zones to be watered for different periods of time at different frequencies and at different times of day. Irrigation timers determine when and for how long water is delivered to each set of the sprinklers and actuate the irrigation valves in a predetermined or selected sequence to accomplish this.

One of the problems with conventional household-type irrigation systems is that they rely on a combination of sliding or rotating switches, push buttons and lighted displays perform and verify various functions, including setting the time of day, when to water, how long to water, etc. These conventional systems often rely on some type of common readout or display and the use of multifunction buttons, switches or other user inputs. The way conventional timers are designed, especially the use of multifunction user inputs, reduces the ease of use for the owner. This is especially true because after first being programmed, programming may not be necessary again for six months; because programming conventional irrigation timers is not necessarily intuitive, the user often needs to find and then re-review the instruction manual to ensure that programming is done properly.

SUMMARY OF THE INVENTION

The present invention is directed to an irrigation timer which substantially eliminates the complexity which is often involved in the use of conventional irrigation timers.

A first aspect of the invention is directed to an irrigation timer of the type including a controller coupleable to a power source and a user input providing an input to the controller. The controller also includes output signal terminals coupleable to irrigation valve actuators and an internal clock. Each irrigation valve actuator is coupleable to an irrigation valve for a watering zone with a watering period setting for each of the watering zones during a watering cycle. The controller divides the watering period for each watering zone by an integer n greater than 1 to obtain fractional watering periods. This permits each zone to be watered for its fractional watering period during a first fractional watering cycle prior to beginning a second fractional watering cycle. n of the fractional watering cycles constitute the watering cycle. The use of fractional watering periods help to spread out watering over a long period of time in each zone.

Another aspect of the invention is directed to an irrigation method in which a watering period is set for each watering zone during a watering cycle. The watering period for each zone is divided by an integer n greater than 1 to obtain fractional watering periods. Each zone is then watered for its fractional watering period during a fractional watering cycle; this watering step is repeated for n fractional watering cycles. The use of fractional watering periods help to spread out the watering over a longer period of time for each watering zone.

Other features and advantages of the invention will appear from the following description in which the preferred embodiment has been set forth in detail in conjunction with the accompanying drawings.

DESCRIPTION OF THE SPECIFIC EMBODIMENTS

Figure 1:
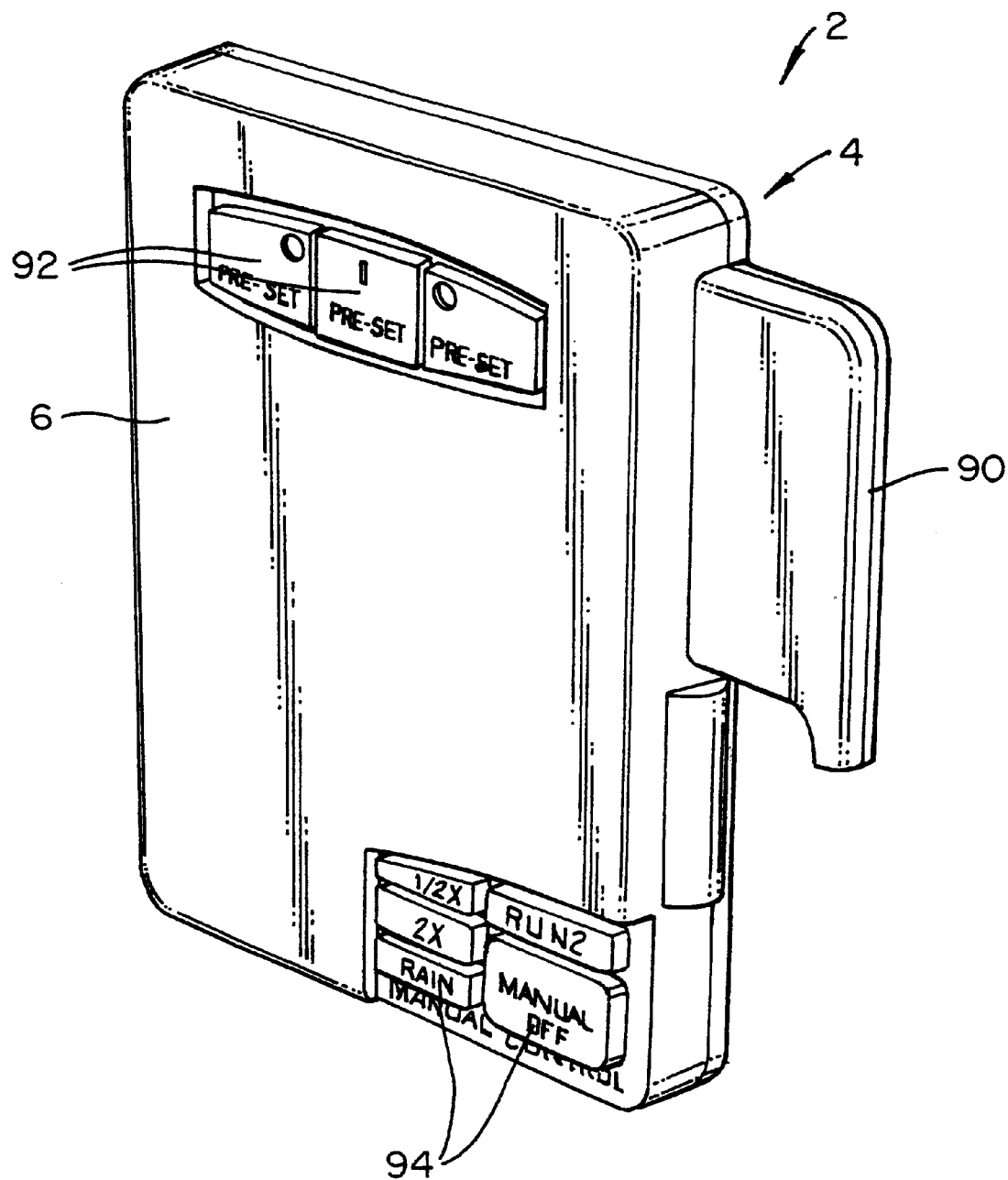
FIG. 1 is an overall view of an irrigation timer made according to the invention.
Figure 2:
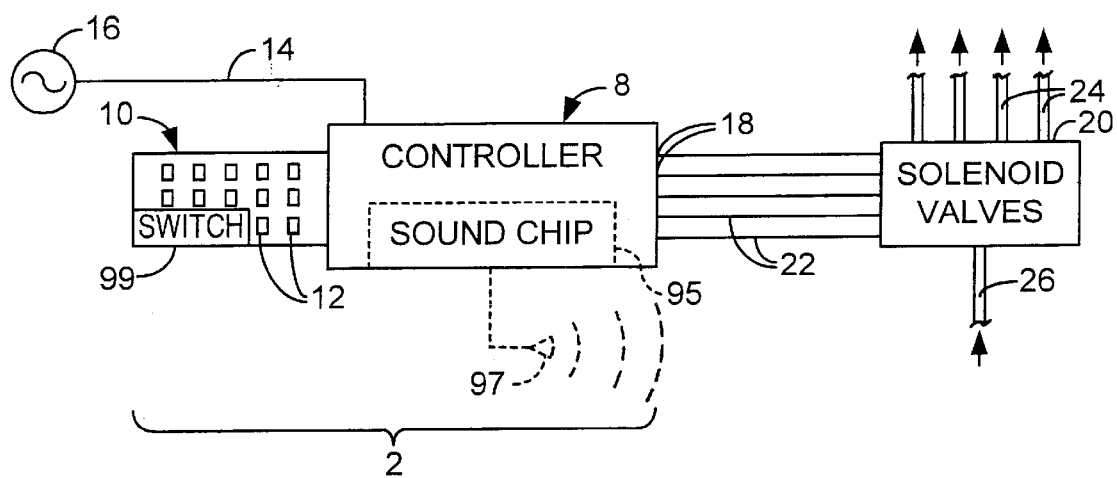
FIG. 2 is a schematic diagram of the irrigation timer of FIG. 1 coupled to a power source and a set of solenoid valves which control the delivery of water to sprinklers at a series of zones.

FIG. 1 illustrates an irrigation timer 2 made according to the invention including a housing 4 having a front door 6, shown in the closed position in FIG. 1. Referring now also to FIG. 2, the irrigation timer 2 is shown to include a controller 8 coupled to a main control panel 10, control panel 10 including user input buttons 12, as will be discussed in more detail below. Controller 8 is typically powered through a power cable 14 connected to a conventional AC power source 16. Irrigation timer 2 could also be powered in other manners, such as through the use of batteries, rechargeable batteries, solar power, etc. Controller 8 has a number of output signal terminals 18 which are connected a set of solenoid valves 20 by a set of output signal lines 22. Solenoid valves 20 are used to selectively connect individual watering lines 24 to a water supply pipe 26. Each watering line 24 is used to deliver water one or more sprinkler heads, drip irrigation lines, or other watering devices, typically collectively referred to as sprinklers. Each set of sprinklers is used to water a particular zone, which may or may not overlap. Individually supplying the different zones with irrigation water from water supply pipe 26 provides several advantages, including delivery of water at higher pressures than if all the sprinklers were provided with water at the same time, permitting different zones to be supplied with irrigation water at different times of day, for different watering durations and at different frequencies, as is conventional.

Figure 3:
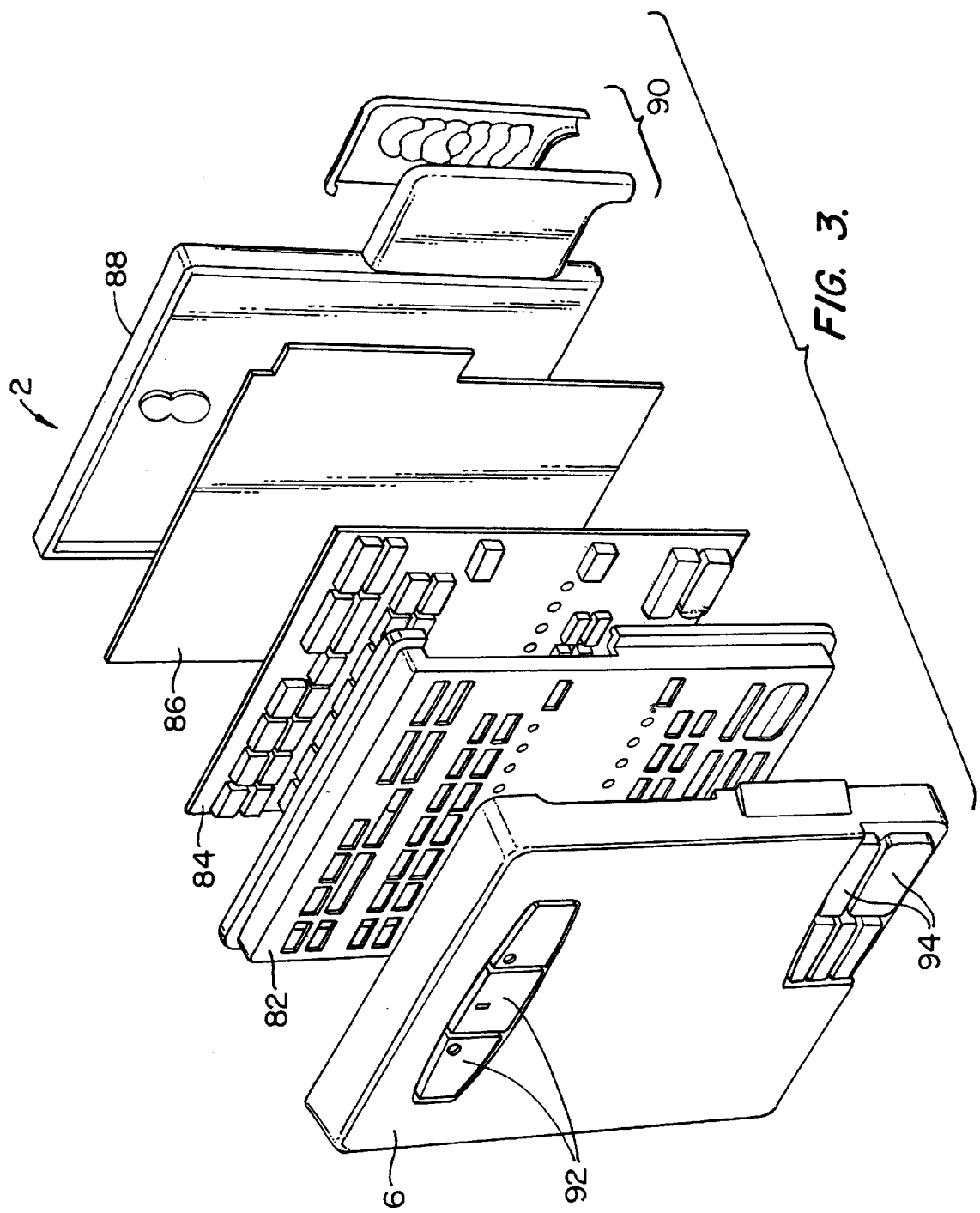
FIG. 3 is an exploded isometric view of various components of the irrigation timer of FIG. 1.
Figure 4:
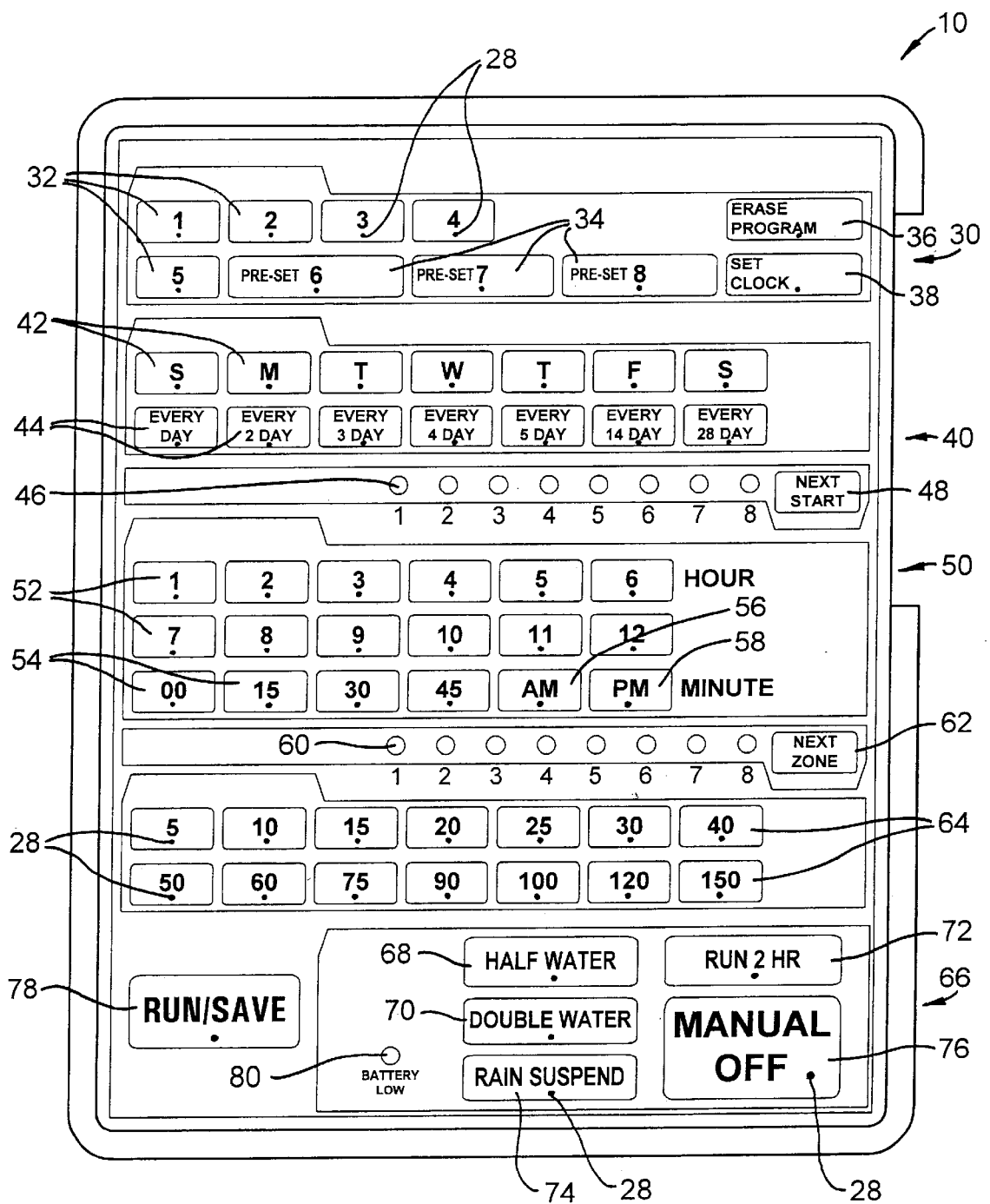
FIG. 4 is a plan view of the main control panel illustrated in FIG. 3.

FIGS. 3 and 4 illustrate main control panel 10 illustrating a number of different types of the user input buttons 12 shown in FIG. 2. Each user input button has a status LED 28 associated with the button which illuminates when the particular function of the button is active to provide the user with an instantaneous visual indication of the programming and/or operational status of the timer. Programming of timer 2 preferably moves in a top-to-bottom manner. Each set of the input buttons is preferably color coded. A set of eight different program buttons 30 include five user-programmed buttons 32, indicated by the numbers 1–5, and three preset program buttons 34, indicated by the numbers 6, 7 and 8. Also included within program buttons 30 are an erase program button 36 and a set clock program button 38. The use of program buttons 30, as well as the other buttons to be discussed below, will be described below.

The next set of buttons are the day select buttons 40 which include seven day-of-week buttons 42, labeled for the days Sunday, Monday, Tuesday, Wednesday, Thursday, Friday, Saturday. Day select buttons 40 also include skip-day buttons 44 with the particular identification of how often the irrigation timer will be actuated for a particular program, such as every day, every second day, every third day, etc. Next is a section for the program LEDs 46 with numerical identifications corresponding to the numerical identifications on user-program buttons 32 and pre-set program buttons 34. A next start button 48 is used in programming timer 2 as discussed below.

The next section includes a number of start time-of-day select buttons 50 including twelve different hour buttons 52, four different minute buttons 54 and AM and PM buttons 56, 58. Buttons 50 are used to select the time-of-day at which a particular program starts a watering cycle.

The next section includes eight different watering zone LEDs 60 which indicate which of eight different watering zones have been programmed or are in operation, as discussed in more detail below. Also included is a next zone button 62 used in programming a number of different watering zones as discussed below. Following the watering zone LEDs 60 are a series of 14 different watering duration select buttons 64, each identified with a numerical indication of the number of, for example, minutes a particular watering cycle will be programmed.

Finally, main control panel 10 includes program override buttons 66 including a half water button 68 and a double water button 70 which cause the particular program which is running or is scheduled to run to either decrease the watering cycle time by half or double the watering cycle time. Half and double water buttons 68, 70 remain activated until deactivated by being pushed again. A run two hour button 72 is used to cause timer 2 to immediately start watering each zone in succession for two hours each.

This two hour watering cycle starts with zone 1 unless next zone button 62 is pushed after start of the two hour cycle. If this occurs the two hour watering cycle will start with the selected zone and then cycle through all zones once. This feature is useful for turning on water to a particular zone or a succession of zones, for, for example, setting or adjusting sprinkler heads.

A rain suspend button 74 is used, as the name suggests, to suspend operation of irrigation timer 2 for that day when watering is not needed; watering will again resume operation the next day. Manual off button 76 is used to turn off timer 2; status LED 28 for manual off button 76 is illuminated when timer is in its off mode. Run/save button 78 is used in various ways during programming, as will be discussed in more detail below. A battery low LED 80 is used to indicate when an internal backup battery, used to keep power supplied to controller 8 during a power outage, needs to be replaced.

Returning to FIG. 3, main control panel 10 is seen to include a panel housing 82 and a conductive rubber keypad 84, housing 82 having appropriate openings through which the various buttons 12 of keypad 84 pass through. Controller 8, plus associated electronics, are mounted to the printed circuit board 86 on the side opposite the viewer in FIG. 3. A back cover 88 covers the component side of printed circuit board 86 and has a cable manager 90 housing terminals 18 and from which output signal lines 22 extend. Front door 6, see also FIG. 1, has a number of front door buttons 92, 94 which overlie selected ones of program buttons 30 and program override button 66, respectively. In particular, front door buttons 92 are identified as three different preset buttons which overlie and engage preset program buttons 34 and permit actuation of preset program buttons 34 when front door 6 is closed. Front buttons 94 overlie and permit the user to actuate selected ones of buttons 68, 70, 72, 74 and 76 when front door 6 is in its closed position of FIG. 1.

Controller 8 optionally includes a sound chip 95, or other sources of voice signals, such as a voice synthesizer, coupled to a speaker 97, both shown in dashed lines in FIG. 2. Voice prompts could begin when the user presses a user-programmed button 32 by timer 2 asking, for example, "What day do you want to water?" The user then presses the desired button(s) 42, 44, such as buttons 42 for Monday, Wednesday, Friday, after which controller 8 could enunciate the chosen days, such as by stating, "You have chosen Monday, Wednesday, Friday." Next, controller 8 could ask, "When do you want to start watering?" to prompt the user to press selected ones of buttons 52, 54, 56, 58. Controller 8 could then enunciate the chosen time, such as "five thirty AM". Programming of timer 2 would preferably proceed with controller 8 asking questions—voice prompts—and then confirming selections—voice confirmations. Voice prompts and voice confirmations could also be provided when setting the clock. Voice confirmations could also be provided when buttons such as half water button 68, run/save button 78, erase program button 36, etc., are pressed.

The irrigation timer 2 is designed to be both extremely simple to use and flexible. In its simplest form irrigation timer 2 can be simply plugged-in to AC power source 16 at a predetermined, known initialization day-of-week and start time-of-day setting, which is preferably provided with the irrigation timer instruction manual and also on the inside of front door 6. Assuming the initialization setting is Sunday at 6:00 PM, the user merely plugs in irrigation timer 2 at Sunday at about 6:00 PM; the internal clock within controller 8 is automatically set to and begins running from the initialization setting (Sunday, 6:00 PM) using one of the preset watering programs. For example, the first preset program (identified as "pre-set 6" in FIG. 4) may be to water 30 minutes, everyday, twice-a-day at 6:00 AM and 8:00 PM for all zones. The second preset program ("pre-set 7"), which is the default program, is for 30 minutes, everyday, once-a-day at 6:00 AM for all zones. The third preset program ("pre-set 8") is for 30 minutes on Monday, Wednesday and Friday, once-a-day at 6:00 AM in all zones. Of course other preset programs may also be provided. Nothing needs to be done except plug in the irrigation timer 2 at a particular date and time and the irrigation timer is operational. Simplified, low level modification of the operation of irrigation timer 2 can be made with front door 6 closed through the use of front door buttons 92 to select a different preset program or with buttons 94 to modify the watering cycle by actuating one or more of buttons 68, 70, 72, 74 and 76.

The basic operation of irrigation timer 2 will now be described. Output signal lines 22 are used to connect output signal terminals 18 to solenoid valves 20. Irrigation timer 2 is activated by plugging power cord 14 into AC power source 16. Irrigation timer 2 is set to its pre-programmed initialization day-of-week and start time-of-day setting. This setting is preferably Saturday or Sunday from 8:00 AM to 8:00 PM—such as Sunday at 6:00 PM. Timer 2 immediately begins running the default program, "pre-set 7" unless one of the other preset program buttons 34, that is "pre-set 6" or "pre-set 8", is pressed directly on main control panel 10 or by using front door buttons 92.

Door 6 is opened to expose main control panel 10 to permit user programming of timer 2. Opening door 6 shows which of the preset programs is operational by the illumination of the associated status LED 28. (If desired, buttons 92, 94 could include, for example, transparent or translucent portions to permit LEDs 28 for the underlying buttons to shine through door 6 when illuminated.) To set the clock, set clock button 38 is pressed and its status LED becomes illuminated. Doing so causes all watering to stop and the status LED for run/save button 78 goes out. The status LED for the particular current day is illuminated, with the default being Sunday as discussed above. If the illuminated day is not correct, the correct day-of-week button 42 is then pressed causing its status LED 28 to go on; the other status LEDs for the other buttons 42 are now out. Next, the appropriate hour button 52, minute button 54 and AM/PM button 56, 58 are pressed causing their associated status LEDs 28 to go on while the others are off. Note that the status LEDs 28 for minute buttons 54 show the nearest quarter hour which has passed so that, for example, minute button "15" is illuminated once the time has reached 15 minutes past the hour and stays illuminated until the time has reached 30 minutes past the hour, at which time the status LED 28 for the minute button "15" goes out and the status LED 28 for the minute button "30" is illuminated. After setting the time, either set clock button 38 or run/save button 78 is pressed to save the current time settings. At that time, the status LED associated with set clock button 38 goes out. To review a clock setting, press set clock button 38 and the clock settings can be reviewed by inspecting which status LEDs 28 are illuminated, at which time the user can change them if necessary. Once any changes have been made, set clock button 38 or run/save button 78 is pressed to save the time.

In this embodiment up to five user created programs can be made, the three preset programs cannot be changed. In the preferred embodiment each of the user-created programs associated with user program buttons 32 has one set of watering days, up to eight start times, and with AM and PM selected up to 16 start times, and up to eight watering zones with 14 different watering durations. Of course other numbers of, for example, start times, watering zones and watering durations, could be used. Assume the first user program button 32 is pressed. This causes all watering to stop and the status LED of the selected button 32 comes on. All other status LEDs 28 will be off except for next start button 48, LED 60 for zone 1, and a water time 00 button (not shown); a water time 00 button may be, and preferably is, provided to permit a user to remove a water time without re-programming the entire program. One or more day select buttons 40, that is one or more of buttons 42 and buttons 44 are pressed; doing so causes their status LEDs 28 to come on. Note, to deselect a day, simply press the button again. One or more of the day-of-week buttons 40 can be selected, but only one of the skip day buttons 44 can be selected; also, if a skip day button 44 is selected, the day-of-week buttons 44 are deselected so that their associated status LEDs 28 go out. Next, the start time-of-day select buttons 50 are pressed thereby selecting the hour with buttons 52, the minutes with buttons 54 and the AM/PM with buttons 56, 58. Doing so selects the time at which a watering cycle is to begin. Next, the desired watering duration select button 64 is pressed.

The above-described procedure has programmed the watering cycle for zone 1, with the zone 1 indicator 60 being illuminated during this process. To program zone 2, next zone button 62 is pressed, which illuminates zone LED 60 for zone 2 and then the appropriate watering duration select button 64 is pressed to select the watering duration for that zone. The pressing of next zone button 62 and water duration select button 64 is repeated until each of the zones has had its water duration selected. If another watering cycle is to be programmed, next start button 48 is pressed to cause the status LED 28 for the second user-programmed button 32 to illuminate and the entire procedure is repeated for the select time-of-day buttons 50, watering duration buttons 64, and zone select button 62 for each start time. After the programming is finished, run/save button 78 is pressed so that the program settings are saved and the program will begin running. When running, the status LED 28 for run/save button 78 will be illuminated. To erase a user-created program, the appropriate user-programmed button 32 is pressed and then the erase program button 36 is pressed so that the status LEDs 28 for both are illuminated; pressing the run/save button 78 erases the selected program.

This procedure can be repeated for one or more of the remaining user-programmed buttons 32.

Figure 5A:
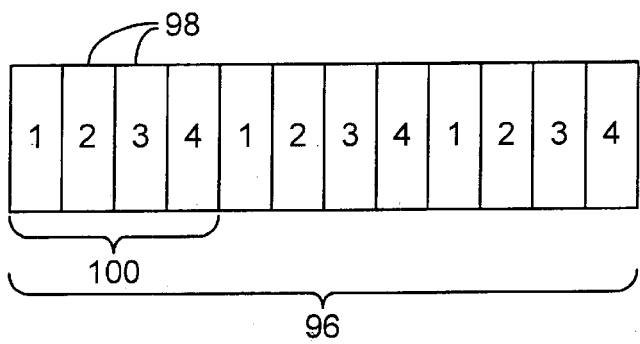
FIGS. 5A–5C schematically illustrate how the watering period setting for each watering zone is broken up into a number of fractional watering periods, where the number is 3 in FIG. 5A, 2 in FIG. 5B and 3 in FIG. 5C, the watering periods for each zone being identical in FIGS. 5A and 5B, but the water period setting for zone 1 being substantially larger than the watering period settings for zones 2, 3 and 4 in FIG. 5C.
Figure 5B:
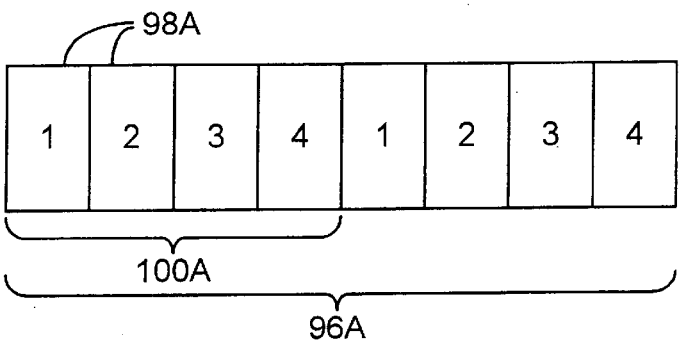
Figure 5C:
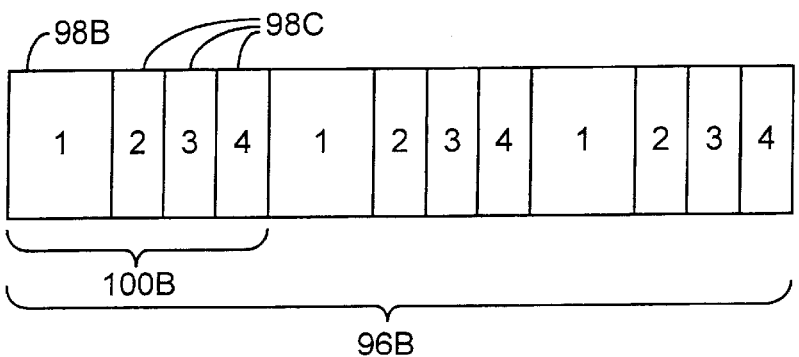

Irrigation timer 2 can be used in what can be called a multiplexing mode as shown in FIGS. 5A–5C as opposed to what is called the stack mode described above. In FIG. 5A, one can assume that there are four zones with each zone being watered for a total of fifteen minutes. This causes watering cycle 96 to extend for sixty minutes in this example. By multiplexing the watering, each zone can be watered for a fraction of the total watering period for that zone. For example, if one were to divide each watering period for each zone by three, and assuming each zone is to be watered for fifteen minutes, we would have a number of fractional watering periods 98 of five minutes each to create a fractional watering cycle 100 for all four zones of 20 minutes. Therefore, 20 minutes would elapse between the start of watering of, for example, zone 1 during one fractional watering cycle and the start of watering of zone 1 during the next fractional watering cycle. This helps to ensure good water management by preventing excessive runoff. Also, when the watering cycle is extensive, for example, four to six hours, this helps to ensure that if the watering cycle 96 begins, for example, at 6:00 AM and ends at noon, that the zones are watered over the entire six hour period; otherwise, zone 1 could be watered from 6:00 AM to 7:30 AM, while zone 4 could be watered from 10:30 AM to 12:00 PM, the evaporation during these two periods typically varying greatly.

FIG. 5B illustrates a different embodiment in which two fractional watering cycles 100A constitute a watering cycle 96A. In this case, each zone is watered twice so that each fractional watering period for a sixty minute watering cycle 96A is equal to 7.5 minutes.

In the FIG. 5C embodiment, zone 1 is to be watered twice as long as any of zones 2, 3 and 4. Therefore, the fractional watering period 98B for zone 1 is twice the fractional watering period 98C for zones 2, 3 and 4. However, the same basic concepts and advantages associated with the multiplexing mode apply by spreading out the watering in different zones over the entire watering cycle even when the zones are watered for different periods of time.

In the above-described multiplexing scheme, controller 8 divides the watering period for each watering zone by an integer, that integer being 3 in the embodiments of FIGS. 5A and 5C and 2 in the embodiment of FIG. 5B. This creates fractional watering periods for each zone by which each zone is watered for its fractional watering period. Therefore, each zone is watered for its fractional watering period during each fractional watering cycle. The number of fractional water cycles are equal to integer n. The multiplexing mode is chosen using a switch 99, see FIG. 2, typically contained within the backup battery compartment (not shown), which is movable between stack mode and multiplexing mode. Multiplexing could be automatic for all watering cycles or only for watering cycles more than a chosen time, such as two hours. Multiplexing could also be individually selected for chosen ones of the eight programs; this would require one or more additional user input buttons 12.

Modifications and variations can be made through the disclosed embodiment without departing from the subject of the invention as defined in the following claims. For example, the particular periods, intervals and numbers can be varied according to the need or perceived need and circumstances. Buttons 64 could include times of, for example, 1, 2, 3, 5, 7, 10, 15, 20, 30, 40, 50, 60, 75 and 90 minutes. User input buttons include any of a variety of user inputs such as push buttons, touch-sensitive panels, membrane keypads, rocker switches and slide switches.

Any and all patents, patent applications and printed publications referred to above are incorporated by reference.

What is claimed is:

1. An irrigation timer of a type including a controller coupleable to a power source, a user input providing an input to the controller, the controller comprising output signal terminals coupleable to irrigation valve actuators and an internal clock, each irrigation valve actuator coupleable to an irrigation valve for a watering zone, said controller comprising a watering period setting for each said watering zone during a watering cycle, an improvement comprising:

a user-actuated multiplexing mode number-selection switch for the user selection of a multiplexing mode integer n greater than 1;

said controller, when in a multiplexing mode, dividing said watering period setting for each said watering zone by n to obtain fractional watering periods by which each zone is watered for its factional watering period during a first fractional watering cycle prior to beginning a second fractional watering cycle, n of said fractional watering cycles constituting said watering cycle;

whereby said fractional watering periods help to spread out the watering over a longer period of time for each watering zone.

2. An irrigation timer according to claim 1, wherein said watering period settings are the same for each said watering zone during a watering cycle.

3. An irrigation timer according to claim 1, wherein said watering period settings are different for at least some of said watering zones during a watering cycle.

4. An irrigation method for use with an irrigation timer of a type including a controller coupleable to a power source, a user input providing an input to the controller, the controller comprising output signal terminals coupleable to irrigation valve actuators and an internal clock, each irrigation valve actuator coupleable to an irrigation valve for a watering zone, comprising:

setting, by a user, a watering period for each said watering zone during a watering cycle;

selecting, by the user, a multiplexing mode integer n greater than 1, n being equal to a number of fractional watering periods desired;

dividing said watering period for each said watering zone by n to obtain fractional watering periods;

watering each zone for its fractional watering period during a fractional watering cycle;

repeating said watering step for n of said fractional watering cycles, whereby said fractional watering periods help to spread out the watering over a longer period of time for each watering zone.

5. An irrigation timer of a type including a controller coupleable to a power source, a user input providing an input to the controller, the controller comprising output signal terminals coupleable to irrigation valve actuators and an internal clock, each irrigation valve actuator coupleable to an irrigation valve for a watering zone, said controller comprising a watering period setting for each said watering zone during a watering cycle, an improvement comprising:

a user-actuated multiplexing mode-selection switch for the user selection of a multiplexing mode;

said controller, when in a multiple mode, dividing said watering period setting for at least a plurality of said watering zones into fractional watering periods by which each of said plurality of watering zones is watered for fractional watering periods during said watering cycle;

whereby said fractional watering periods help to spread out the watering over a longer period of time for each watering zone.

6. An irrigation method for use with an irrigation timer of a type including a controller coupleable to a power source, a user input providing an input to the controller, the controller comprising output signal terminals coupleable to irrigation valve actuators and an internal clock, each irrigation valve actuator coupleable to an irrigation valve for a watering zone, comprising:

setting, by a user, a watering period for each said watering zone during a watering cycle;

setting, by the user, the controller to a multiplexing mode;

watering at least a plurality of said watering zones for fractional watering periods during a fractional watering cycle;

repeating said watering step for at least a second said fractional watering cycle, whereby said fractional watering periods help to spread out the watering over a longer period of time for each watering zone.

\* \* \* \* \*